US011951071B2

(12) United States Patent
Arsin et al.

(10) Patent No.: US 11,951,071 B2
(45) Date of Patent: Apr. 9, 2024

(54) HEATED MASSAGE PILLOW

(71) Applicant: Sundance Spas, Inc., Chino, CA (US)

(72) Inventors: Carl Arsin, La Crescenta, CA (US); Mark Knight, Venice, CA (US)

(73) Assignee: Sundance Spas, Inc., Chino, CA (US)

( * ) Notice: Subject to any disclaimer, the term of this patent is extended or adjusted under 35 U.S.C. 154(b) by 353 days.

(21) Appl. No.: 17/102,985

(22) Filed: Nov. 24, 2020

(65) Prior Publication Data

US 2021/0154087 A1 May 27, 2021

Related U.S. Application Data

(60) Provisional application No. 62/993,794, filed on Mar. 24, 2020, provisional application No. 62/939,725, filed on Nov. 25, 2019.

(51) Int. Cl.
*A61H 9/00* (2006.01)
*A61H 33/00* (2006.01)

(52) U.S. Cl.
CPC ....... *A61H 9/0071* (2013.01); *A61H 33/6063* (2013.01); *A61H 33/6089* (2013.01); *A61H 2201/0134* (2013.01); *A61H 2201/0207* (2013.01); *A61H 2205/02* (2013.01); *A61H 2205/04* (2013.01)

(58) Field of Classification Search
CPC .......... A61H 1/00; A61H 9/00; A61H 9/0007; A61H 9/0071; A61H 23/00; A61H 33/0087; A61H 33/6021; A61H 33/6063; A61H 33/6089; A61H 37/00; A61H 2033/0037; A61H 2201/0115; A61H 2201/0134; A61H 2201/0207; A61H 2201/1604; A61H 2201/1609; A61H 2205/02; A61H 2205/04
See application file for complete search history.

(56) References Cited

U.S. PATENT DOCUMENTS

| | | | | |
|---|---|---|---|---|
| 5,503,618 A | 4/1996 | Rey | | |
| 5,546,616 A * | 8/1996 | Bloemer | ................ | A61H 33/60 4/575.1 |
| 5,716,333 A | 2/1998 | Larsen | | |
| 5,928,171 A | 7/1999 | Larsen | | |
| 6,186,964 B1 * | 2/2001 | Branham | .............. | A61H 23/04 601/155 |
| 6,551,263 B2 | 4/2003 | Turner | | |

(Continued)

*Primary Examiner* — Justine R Yu
*Assistant Examiner* — Matthew R Moon
(74) *Attorney, Agent, or Firm* — The Webb Law Firm

(57) ABSTRACT

A massage pillow configured to be positioned over a fluid jet includes a cushion and a retaining assembly. The cushion includes a front surface, a rear surface, and side surfaces extending there between. The rear surface includes an annular edge defining an opening providing access to an interior of the cushion sized to at least partially cover the jet. The retainer assembly includes an opening configured to align with the jet and a peripheral edge configured to retain the annular edge of the cushion. The retainer assembly is configured to be removably fixed to a wall surrounding the jet with the jet aligned with the opening of the retainer assembly and the opening of the cushion, such that fluid expelled from the jet passes into the interior of the cushion, so that the pillow provides massage and/or warmth due to the expelled fluid.

20 Claims, 13 Drawing Sheets

(56) References Cited

U.S. PATENT DOCUMENTS

| | | | | |
|---|---|---|---|---|
| 6,993,797 | B1 * | 2/2006 | Yang | A47K 3/125 4/575.1 |
| 7,310,835 | B2 * | 12/2007 | Walker | A61H 33/60 4/575.1 |
| 8,141,181 | B2 | 3/2012 | Faulstich | |
| 2002/0053105 | A1 * | 5/2002 | Turner | A61H 33/6089 4/541.1 |
| 2009/0139020 | A1 * | 6/2009 | Faulstich | A61H 33/6063 4/575.1 |

* cited by examiner

HEATED MASSAGE PILLOW

CROSS REFERENCE TO RELATED APPLICATIONS

This application claims priority to U.S. Provisional Patent Application No. 62/939,725, entitled "Heated Massage Pillow," filed Nov. 25, 2019, and U.S. Provisional Patent Application No. 62/993,794, entitled "Heated Massage Pillow," filed Mar. 24, 2020, the disclosure of each of which is hereby incorporated by reference in its entirety.

BACKGROUND OF THE INVENTION

Field of the Invention

This disclosure is directed to a pillow or cushion, such as a headrest or neck support, adapted to be connected to a fluid jet to provide warmth and/or massage for a user from pressurized liquid from the fluid jet, as well as to a fluid-containing vessel or container including a jet assembly and massage pillow mounted to the jet assembly.

Description of Related Art

Recreational and therapeutic fluid-containing vessels, such as spas, pools, bathtubs, baths, hot tubs, Roman tubs, whirlpools, and hydrotherapeutic tubs, often include one or more jets or nozzles for expelling a pressurized liquid stream into the container or vessel. The jet(s) can be connected to a fluid circulation system including a suction inflow for drawing fluid from the vessel into the circulation system, and a pump for producing the stream of pressurized fluid. The jet(s) can have a variety of designs configured to produce different patterns or intensities of fluid streams. Some jets include adjustable or rotational nozzles for changing a direction or intensity of the liquid stream expelled from the jet.

Fluid-containing vessels, such as spas, often include dedicated seating areas or structures for supporting a user. For example, a seat or bench can be formed in a sidewall of the vessel to enhance user comfort. Some of the jets of the fluid circulation system can be strategically positioned in the seating areas to provide targeted massage and warming for portions of the user's body. To further enhance comfort, the spa may include a padded headrest or neck support for supporting the user's head and/or neck when the user sits or reclines in the seating area or bench. Headrests or pillows for use with fluid-containing vessels may be formed from foams, gels, natural or synthetic fabrics, synthetic and natural stuffing materials, inflated bladders, or other known cushioning materials, as are known in the art.

SUMMARY OF THE INVENTION

There is a need for spa designs and accessories that improve user comfort. In particular, the present disclosure is directed to a cushion that both supports the user's head and/or neck to avoid contact with hard surfaces, such as the spa wall or shell, and also provides warmth and massage due to fluid expelled from a jet or jet assembly.

According to an aspect of the disclosure, a massage pillow configured to be positioned over at least one fluid jet includes a cushion and a retaining assembly. The cushion includes a front surface, a rear surface, and side surfaces extending between the front surface and the rear surface. The rear surface of the cushion includes an annular edge defining an opening providing access to an interior of the cushion sized to at least partially cover the at least one jet. The retainer assembly includes an opening configured to align with the at least one jet and a peripheral edge configured to retain the annular edge of the cushion. The retainer assembly is configured to be removably fixed to a wall surrounding the at least one jet with the at least one jet aligned with the opening of the retainer assembly and the opening of the cushion, such that fluid expelled from the at least one jet passes into the interior of the cushion, so that the pillow provides at least massage and/or warmth due to the expelled fluid.

According to another aspect of the disclosure, a fluid-containing vessel includes: a wall defining a fluid-containing portion; at least one jet extending through the wall for expelling pressurized fluid into the fluid-containing portion of the vessel; a fluid circulation system; and a massage pillow. The fluid circulation system includes a pump and a plurality of conduits for conducting fluid between the fluid-containing portion of the vessel, the pump, and the at least one jet. The massage pillow includes a cushion and a retainer assembly. The cushion includes a front surface, a rear surface, and side surfaces extending between the front surface and the rear surface. The rear surface includes an annular edge defining an opening providing access to an interior of the cushion sized to at least partially cover the at least one jet. The retainer assembly includes an opening configured to align with the at least one jet and a peripheral edge configured to retain the annular edge of the cushion. The retainer assembly is configured to be removably fixed to the wall of the vessel with the at least one jet aligned with the opening of the retainer assembly and the opening of the cushion, such that fluid expelled from the at least one jet passes into the interior of the cushion, so that the pillow provides at least massage and/or warmth due to the expelled fluid.

According to another aspect of the disclosure, a method for mounting a massage pillow to a fluid-containing vessel includes a step of providing a cushion of the massage pillow. The cushion includes a front surface, a rear surface, and side surfaces extending between the front surface and the rear surface. The rear surface includes an annular edge defining an opening providing access to an interior of the cushion sized to at least partially cover at least one jet extending through a wall of the fluid-containing vessel. The method also includes a step of connecting a retainer assembly including an opening configured to align with the at least one jet to the cushion of a massage pillow such that the annular edge on the rear surface of the cushion is retained by a peripheral edge of the retainer assembly. The method also includes a step of mounting the retainer assembly to the wall of the fluid-containing vessel, such that the at least one jet of the fluid-containing vessel is received by the opening of the retainer assembly and is positioned to expel fluid through the opening of the retainer assembly and into the interior of the cushion of the massage pillow.

Examples of the present invention will now be described in the following numbered clauses:

Clause 1: A massage pillow configured to be positioned over at least one fluid jet, the massage pillow comprising: a cushion comprising a front surface, rear surface, and side surfaces extending between the front surface and the rear surface, the rear surface comprising an annular edge defining an opening providing access to an interior of the cushion sized to at least partially cover the at least one jet; and a retainer assembly comprising an opening configured to align with the at least one jet and a peripheral edge configured to retain the annular edge of the cushion, wherein the retainer assembly is configured to be removably fixed to a wall surrounding the at least one jet with the at least one jet aligned with the opening of the retainer assembly and the opening of the cushion, such that fluid expelled from the at least one jet passes into the interior of the cushion, so that the pillow provides at least massage and/or warmth due to the expelled fluid.

Clause 2: The massage pillow of clause 1, wherein the massage pillow is configured to be positioned over at least two linearly-aligned fluid jets.

Clause 3: The massage pillow of clause 1 or clause 2, wherein the cushion comprises molded plastic.

Clause 4: The massage pillow of any of clauses 1-3, wherein the cushion is sufficiently rigid to maintain its shape when fluid is not being expelled from the at least one jet.

Clause 5: The massage pillow of any of clauses 1-4, wherein the cushion is sufficiently rigid to support a user's head when fluid is not being expelled from the at least one jet.

Clause 6: The massage pillow of any of clauses 1-5, wherein the front surface of the cushion is configured to support a user's head and/or neck and the rear surface of the cushion is configured to rest against the wall.

Clause 7: The massage pillow of any of clauses 1-6, wherein the cushion further comprises at least one drainage opening extending through the side surface of the cushion for draining fluid from the interior of the cushion.

Clause 8: The massage pillow of any of clauses 1-7, wherein the cushion further comprises an annular shroud extending from the rear surface of the cushion about the annular edge, the annular shroud being configured to seal the peripheral edge of the retaining assembly and/or at least a portion of the at least one jet.

Clause 9: The massage pillow of any of clauses 1-8, wherein the retainer assembly comprises at least one first retainer fixed to at least one second retainer, with the annular edge of the cushion retained between the retainers, thereby fixing the cushion to the retainer assembly.

Clause 10: The massage pillow of clause 9, wherein the at least one first retainer and the at least one second retainer each comprise openings configured to be aligned with the at least one jet when the massage pillow is positioned over the at least one jet.

Clause 11: The massage pillow of clause 9 or clause 10, wherein the at least one first retainer is connected to the at least one second retainer by a cantilever snap-fit connection.

Clause 12: The massage pillow of any of clauses 1-11, wherein the retainer assembly comprises at least one threaded post extending from a proximal facing side of the retainer assembly, the at least one threaded post being configured to anchor the massage pillow to the wall.

Clause 13: The massage pillow of any of clauses 1-11, wherein the retainer assembly further comprises at least one snap-fit joint configured to engage a corresponding grommet mounted to the wall for removably fixing the massage pillow to the wall.

Clause 14: The massage pillow of any of clauses 1-11, wherein the retainer assembly comprises at least one locking tab configured to engage a corresponding slot of a mounting member mounted to the wall for removably connecting the retainer assembly to the mounting member.

Clause 15: The massage pillow of clause 14, wherein the at least one locking tab is configured to be slideably received within the at least one slot, such that the massage pillow can be slidably connected and removed from the mounting member.

Clause 16: The massage pillow of any of clauses 1-11, wherein the retainer assembly is configured to be mounted to the mounting member by a snap-fit connection, in which at least one snap-fit member of the mounting member engages an inner edge extending about the opening of the retainer assembly.

Clause 17: A fluid-containing vessel comprising: a wall defining a fluid-containing portion; at least one jet extending through the wall for expelling pressurized fluid into the fluid-containing portion of the vessel; a fluid circulation system comprising: a pump and a plurality of conduits for conducting fluid between the fluid-containing portion of the vessel, the pump, and the at least one jet; and a massage pillow configured to be positioned over at least one fluid jet, the massage pillow comprising: a cushion comprising a front surface, rear surface, and side surfaces extending between the front surface and the rear surface, the rear surface comprising an annular edge defining an opening providing access to an interior of the cushion sized to at least partially cover the at least one jet; and a retainer assembly comprising an opening configured to align with the at least one jet and a peripheral edge configured to retain the annular edge of the cushion, wherein the retainer assembly is configured to be removably fixed to the wall of the vessel with the at least one jet aligned with the opening of the retainer assembly and the opening of the cushion, such that fluid expelled from the at least one jet passes into the interior of the cushion, so that the pillow provides at least massage and/or warmth due to the expelled fluid.

Clause 18: The fluid-containing vessel of clause 17, further comprising a control valve connected to the plurality of conduits between the pump and the at least one jet, wherein the control valve is configured to adjust the at least on of flow volume or pressure of fluid expelled from the at least one jet.

Clause 19: The fluid-containing vessel of clause 17 or clause 18, wherein the fluid circulation system comprises at least two jets, and wherein the opening of the retainer assembly is sized to receive the at least two jets.

Clause 20: A method for mounting a massage pillow to a fluid-containing vessel, the method comprising: providing a cushion of the massage pillow, the cushion comprising a front surface, a rear surface, and side surfaces extending between the front surface and the rear surface, the rear surface comprising an annular edge defining an opening providing access to an interior of the cushion sized to at least partially cover at least one jet extending through a wall of the fluid-containing vessel; connecting a retainer assembly comprising an opening configured to align with the at least one jet to the cushion of a massage pillow such that the annular edge on the rear surface of the cushion is retained by a peripheral edge of the retainer assembly; and mounting the retainer assembly to the wall of the fluid-containing vessel, such that the at least one jet of the fluid-containing vessel is received by the opening of the retainer assembly and is positioned to expel fluid through the opening of the retainer assembly and into the interior of the cushion of the massage pillow.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. As used in the specification and the claims, the singular form of "a", "an", and "the" include plural referents unless the context clearly dictates otherwise.

DETAILED DESCRIPTION OF THE PRESENT INVENTION

Figure 1A:
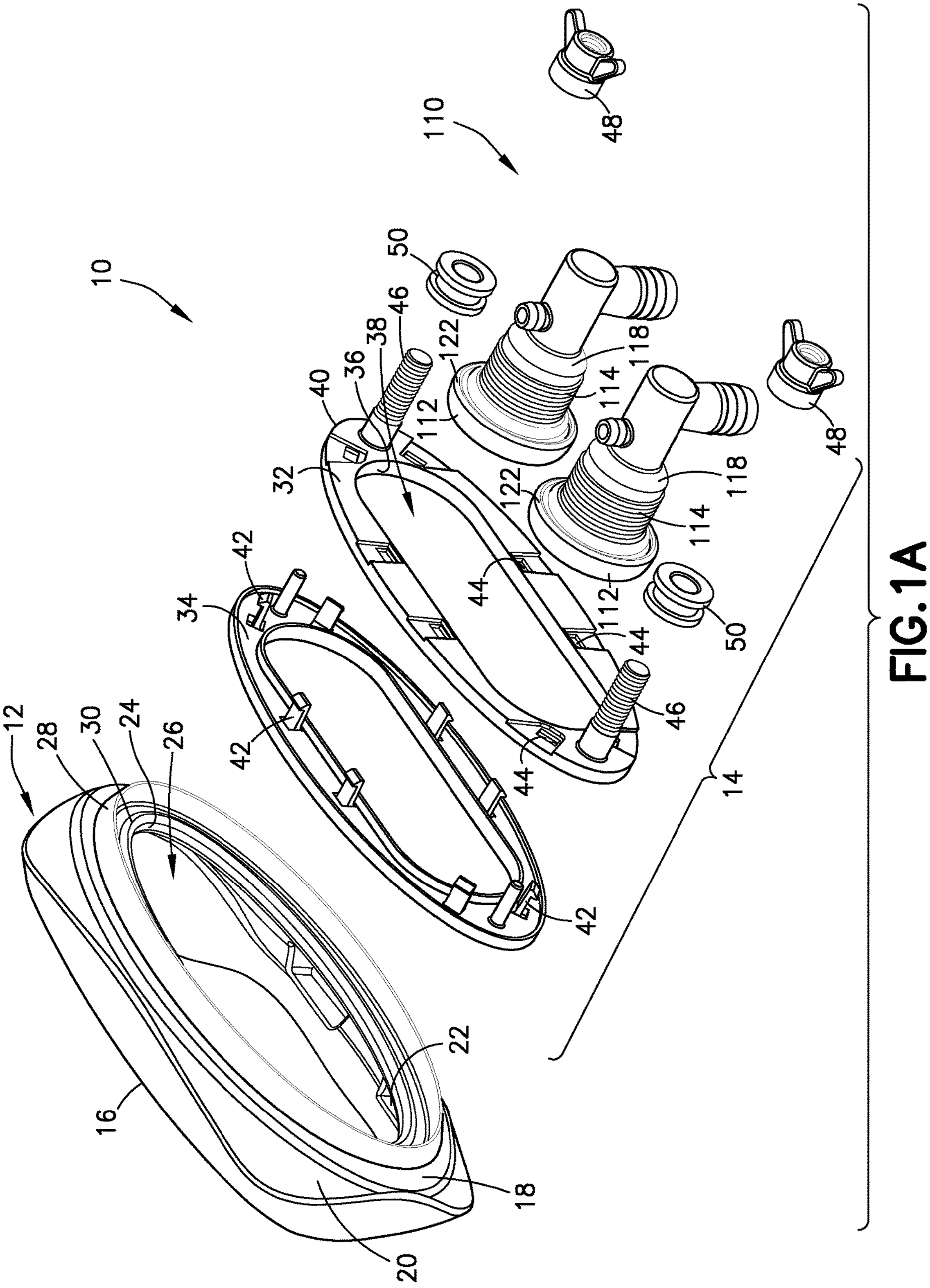
FIG. 1A is perspective exploded view of a massage pillow, according to an aspect of the disclosure.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. The term "proximal" as used herein refers to a portion of an object that is connected to or located nearest to an actuating mechanism, such as a pump. For example, a proximal end of a spa jet refers to an end of the jet connected to a conduit extending from the pump. The term "distal" refers to a portion of the object opposite the proximal portion of the object. For example, the "distal" end of a spa jet refers to the portion of the jet that extends away from the wall or shell of the spa and into the fluid-filled container or vessel. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

Figure 6:
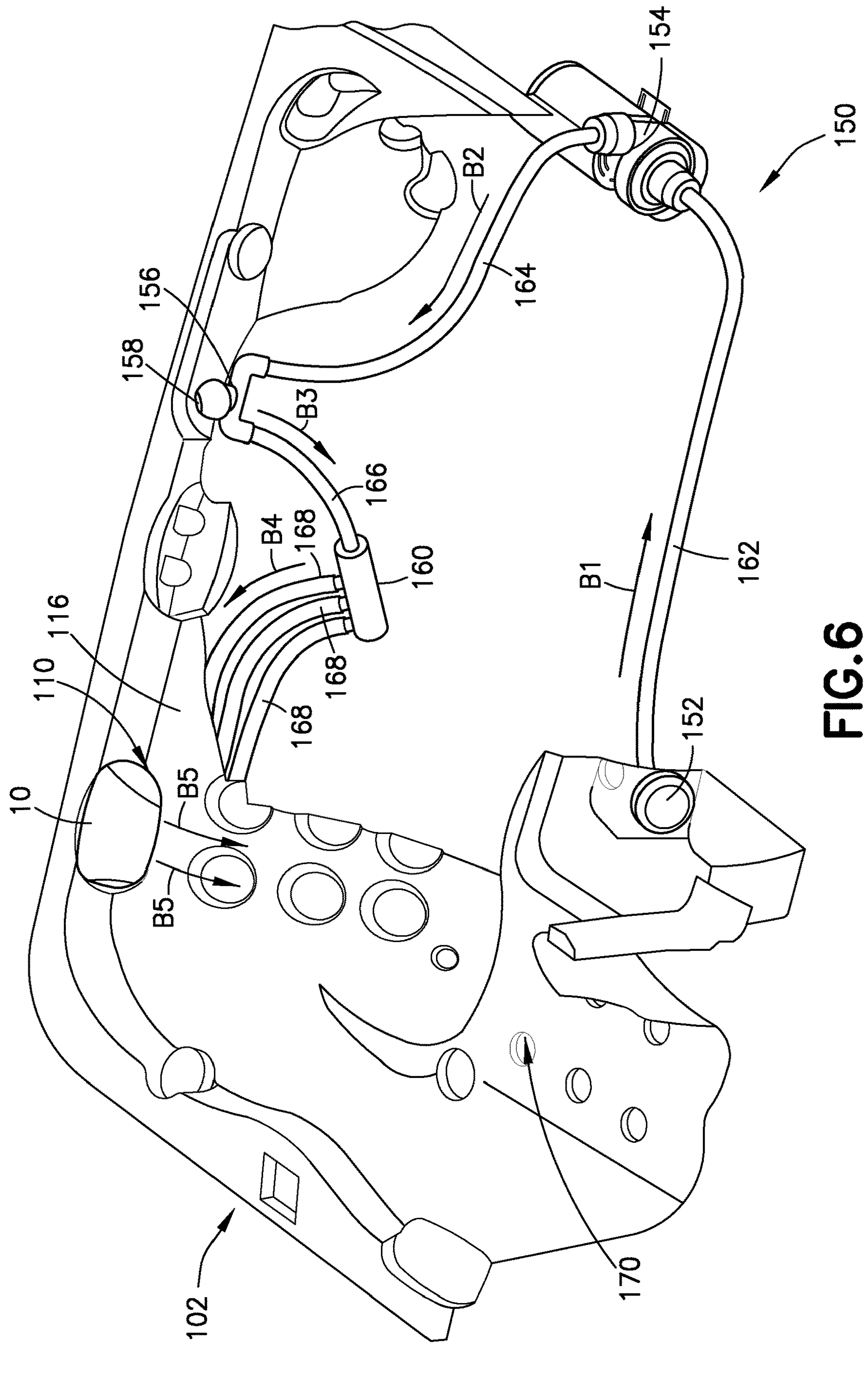
FIG. 6 is a perspective view of a portion of a spa including a massage pillow mounted to a wall of the spa, according to an aspect of the disclosure.

The present disclosure is directed to a massage pillow 10, 10*b*, 10*c*, 10*d* configured to be mounted to a jet assembly 110 including fluid jets 112 or nozzles for expelling streams of pressurized fluid into a fluid-containing vessel 102 (shown, for example, in FIG. 6). As used herein, a fluid-containing vessel 102 can refer to any hollow or partially hollow container or enclosure configured to hold a quality of fluid including, for example, hot tubs, bath tubs, Roman tubs, spas, whirlpools, above-ground pools, below-ground pools, and similar structures. The massage pillows 10, 10*b*, 10*c*, 10*d* disclosed herein can also be used with other enclosures, which include walls for supporting a jet and drains for collecting water expelled from jets, such as shower stalls, saunas, steam baths, and similar enclosures, as are known in the art. The fluid-containing vessels 102 generally include walls 116 (shown in FIGS. 1B, 2B, 3B, and 4B) or a shell, including a bottom and sides. The jets 112 can be mounted to and extend through openings in the walls 116 or shell.

In some examples, each jet 112 of the jet assembly 110 includes a housing 114 for mounting the jets 112 to the wall 116 or shell of the fluid-filled vessel 102. The housing 114 can include a proximal end 118 configured to be connected to a fluid conduit 168, such as a tube or pipe, configured to provide a pressurized liquid stream or flow to the jet 112. Each jet 112 can also include a distal end 122 extending through the opening 124 of the wall 116 and a sidewall extending between the proximal end 118 and the distal end 122. The jets 112 can be formed from any sufficiently strong, rigid material configured to withstand temperature and pressure produced by commercially available spas and hot tubs. The jet assembly 110 also includes connectors or fasteners for mounting the housing 114 to the wall 116 to provide a leak-proof seal between the housing 114 and the wall 116. For example, the jet assembly 110 can include one or more gaskets, seals, retaining rings, fasteners, and similar connectors, as are known in the art, for holding the jet assembly 110 in place against the wall 116 in a secure and leak-proof manner.

Figure 3A:
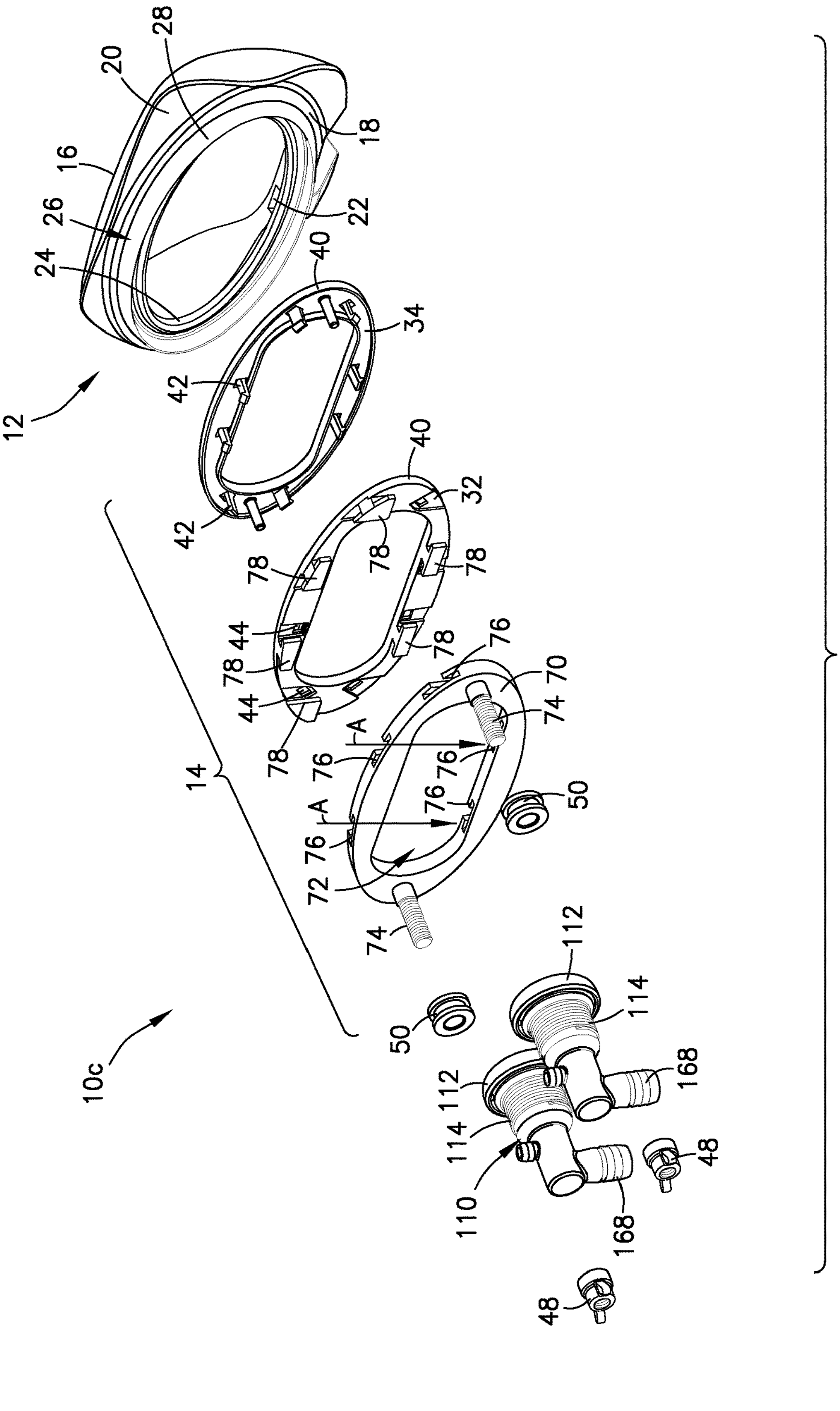
FIG. 3A is a perspective exploded view of another example of a massage pillow, according to an aspect of the disclosure.
Figure 3B:
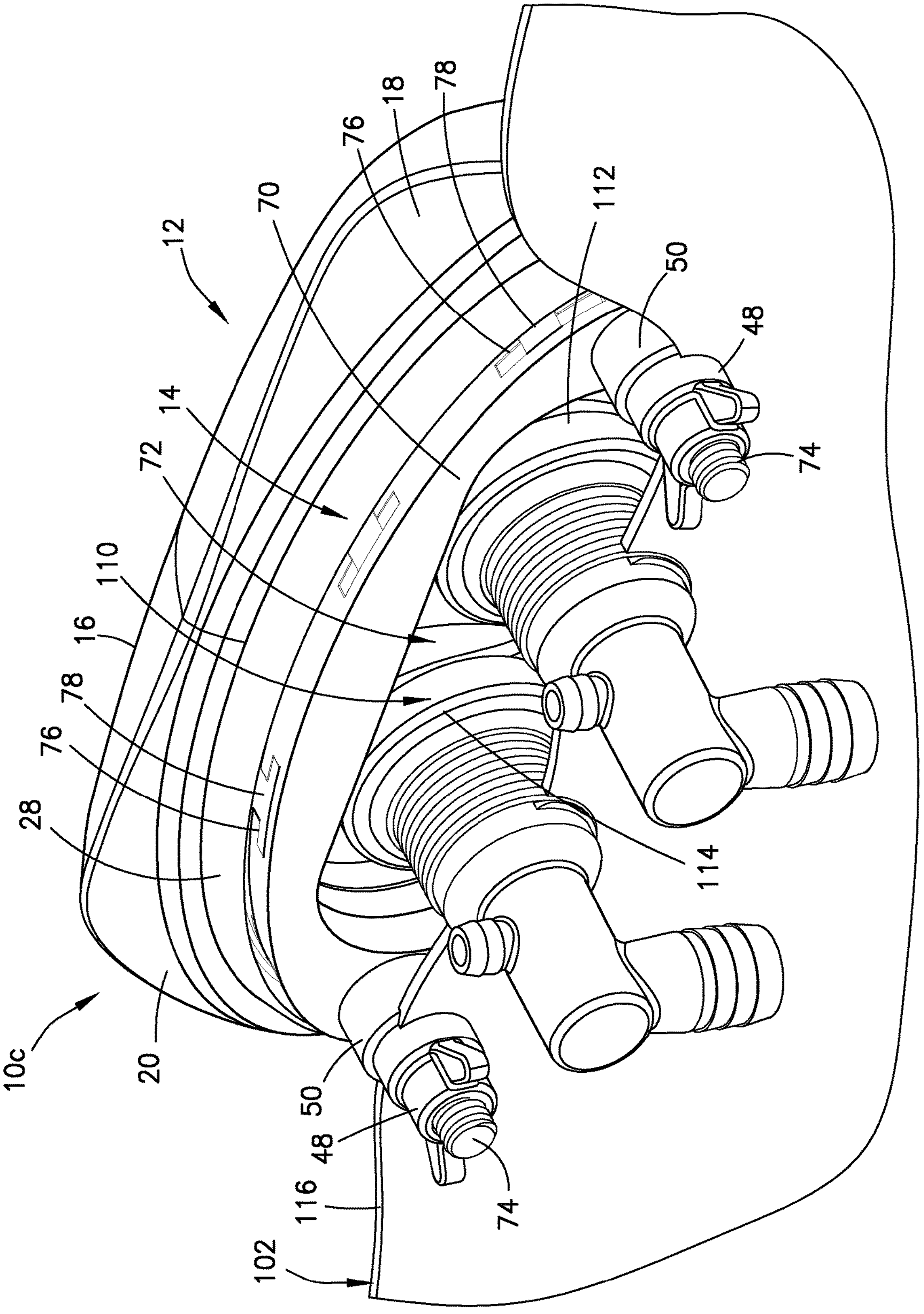
FIG. 3B is a perspective view of a rear side of the massage pillow of FIG. 3A mounted to a wall of a spa.
Figure 4A:
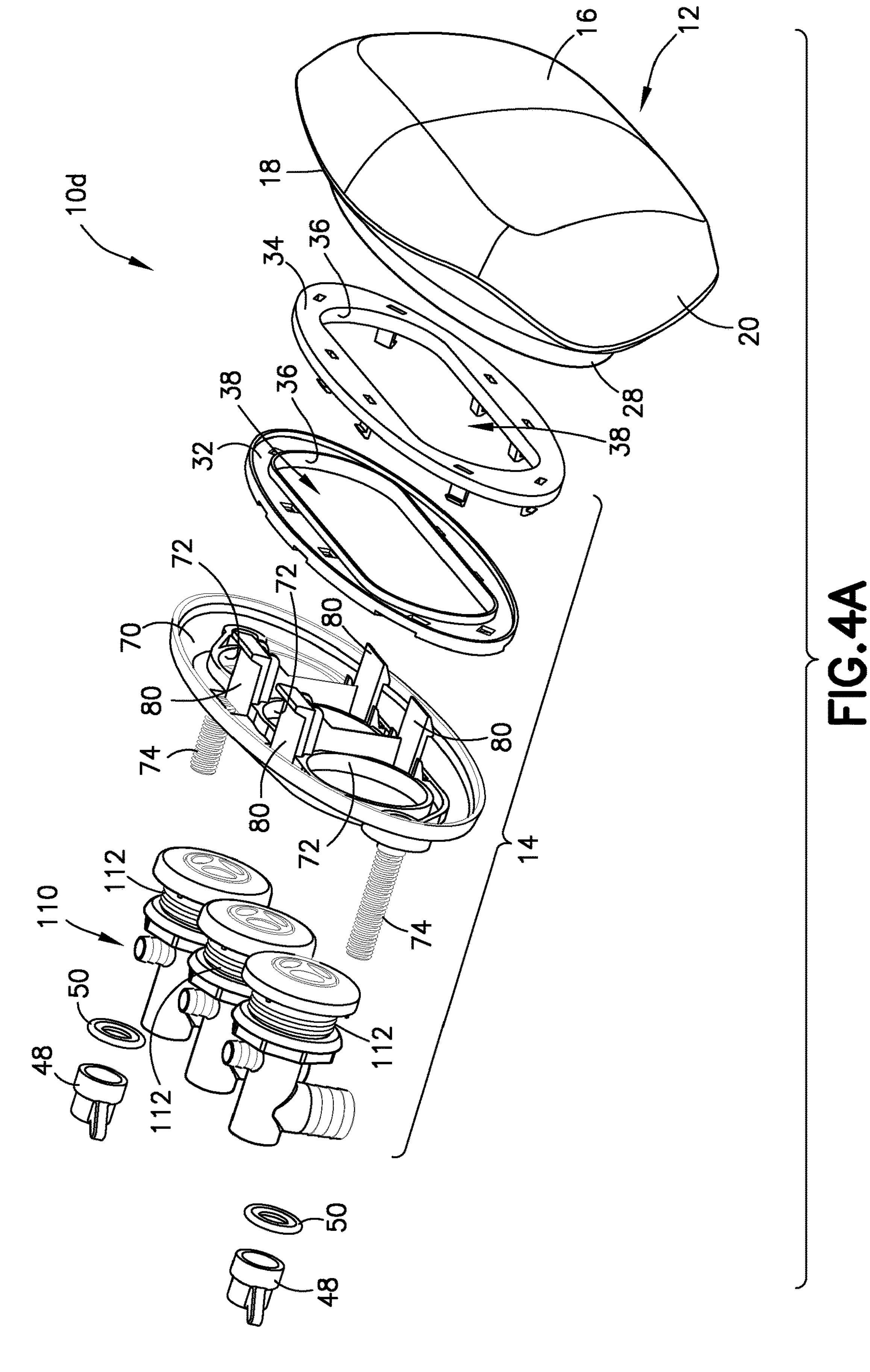
FIG. 4A is a perspective exploded view of another example of a massage pillow, according to another aspect of the disclosure.
Figure 4B:
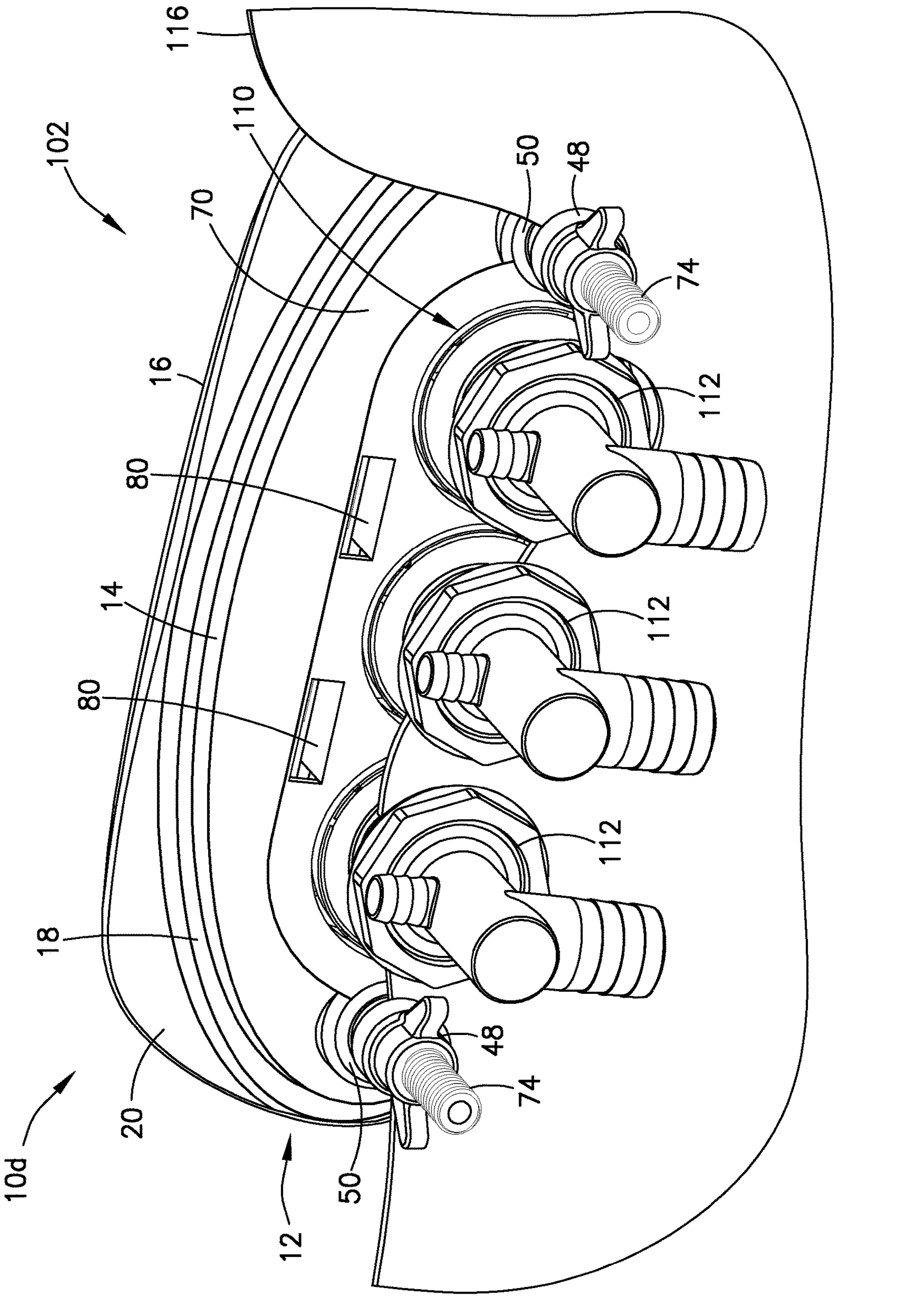
FIG. 4B is a perspective view of a rear side of the massage pillow of FIG. 4A mounted to a wall of a spa.

The jet assembly 110 can include multiple jets 112. For example, as shown in FIGS. 1A, 1B, 2A, 2B, 3A, and 3B, a jet assembly 110 can include two jets 112. In other examples, as shown in FIGS. 4A and 4B, a jet assembly 110 can include three linearly arranged jets 112. In other examples, the jet assembly 110 can include three or more jets 112 arranged in a triangular pattern or in any other convenient arrangement. Due to pressurized fluid expelled from jets 112, the massage pillow 10 provides a soft pulsing and vibration massage sensation to a head and neck region of a user. In some examples, one or more of the jets 112 of the jet assembly 110 can be rotating or rotational jets to provide targeted or variable pressure, vibrations, and pulses to different areas of the cushion 12. In other examples, one or more of the jets 112 are stationary, configured to expel a stream of water in one direction. The massage pillow 10 also provides a warming sensation, since fluid from the jets 112 can be heated. Due to the massaging and warming features, the massage pillow 10 disclosed herein provides enhanced comfort and therapeutic effects compared to conventional padded headrests, neck supports, and pillows, which merely support the user's head and neck, and do not provide warming and/or massage.

In some examples, the intensity of the pulses and vibrations provided by the massage pillow 10 can be adjusted by a flow control valve 156 (e.g., an on-off flow control valve) (shown in FIGS. 5 and 6) for the fluid jets 112. When fluid flow from the jets 112 is turned off by the control valve 156, the pillow 10 can be used as a conventional pillow or headrest. In particular, the massage pillow 10 may be sufficiently rigid to maintain its shape and support a user's head even when there is no fluid flow from the jets 112 into an interior of the pillow 10.

In some examples, the massage pillows 10 disclosed herein can be removably connected to the wall 116 of the fluid-containing vessel 102 over the jets 112, so that the massage pillow 10 can be installed to the vessel 102 as post-manufacture accessory and/or can be removed from the vessel 102 if, for example, the user decides that the pillow 10 is no longer wanted. Also, the pillow 10 can be removed to provide access to the jets 112, so that the jets 112 can be serviced. For example, the pillow 10 can be removed from the jets 112 during flushing of the fluid circulation system for maintenance or to repair or replace components of the jet assembly 110.

Figure 1B:
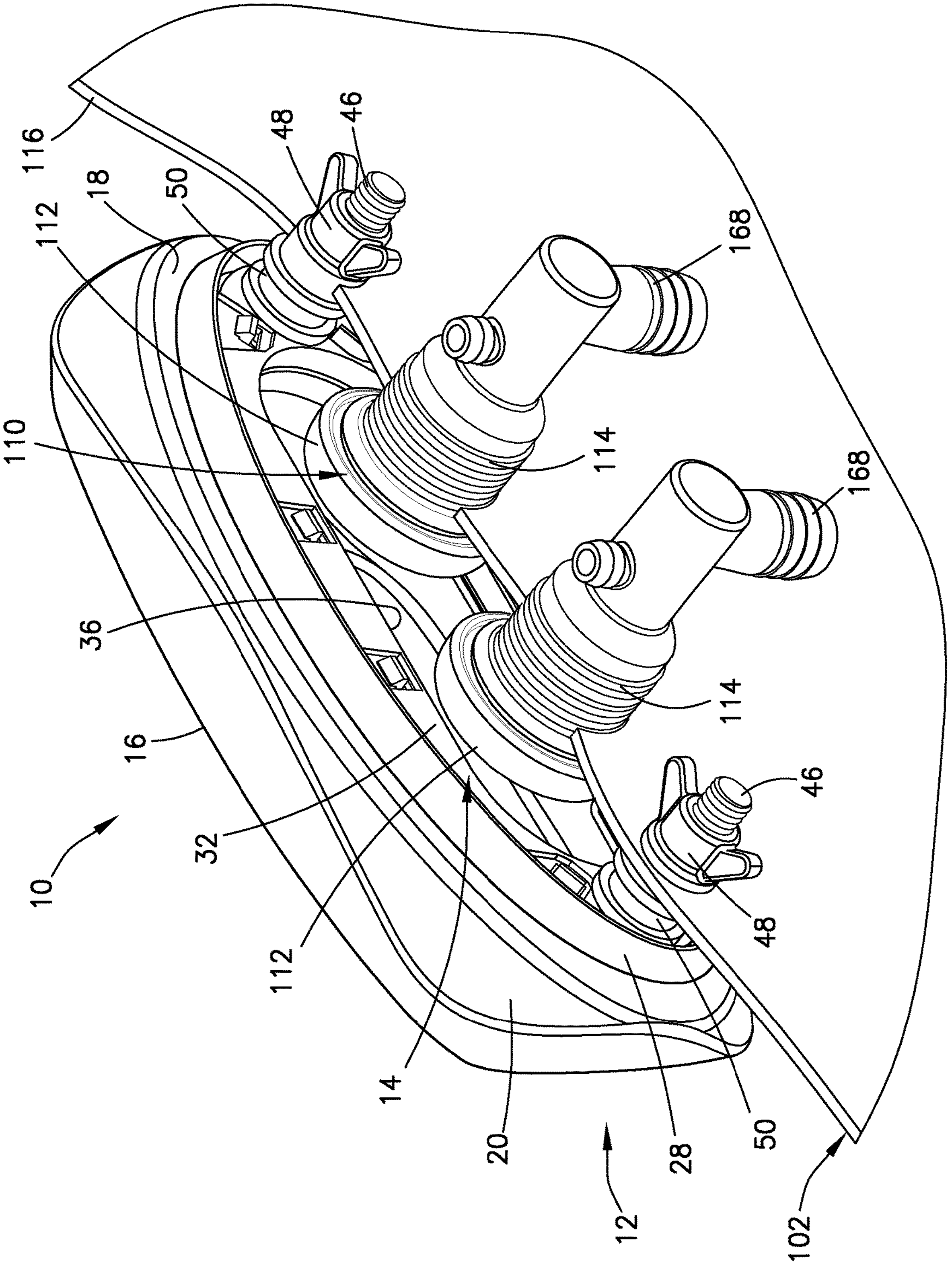
FIG. 1B is a perspective view of a rear side of the massage pillow of FIG. 1A mounted to a wall of a spa.
Figure 1C:
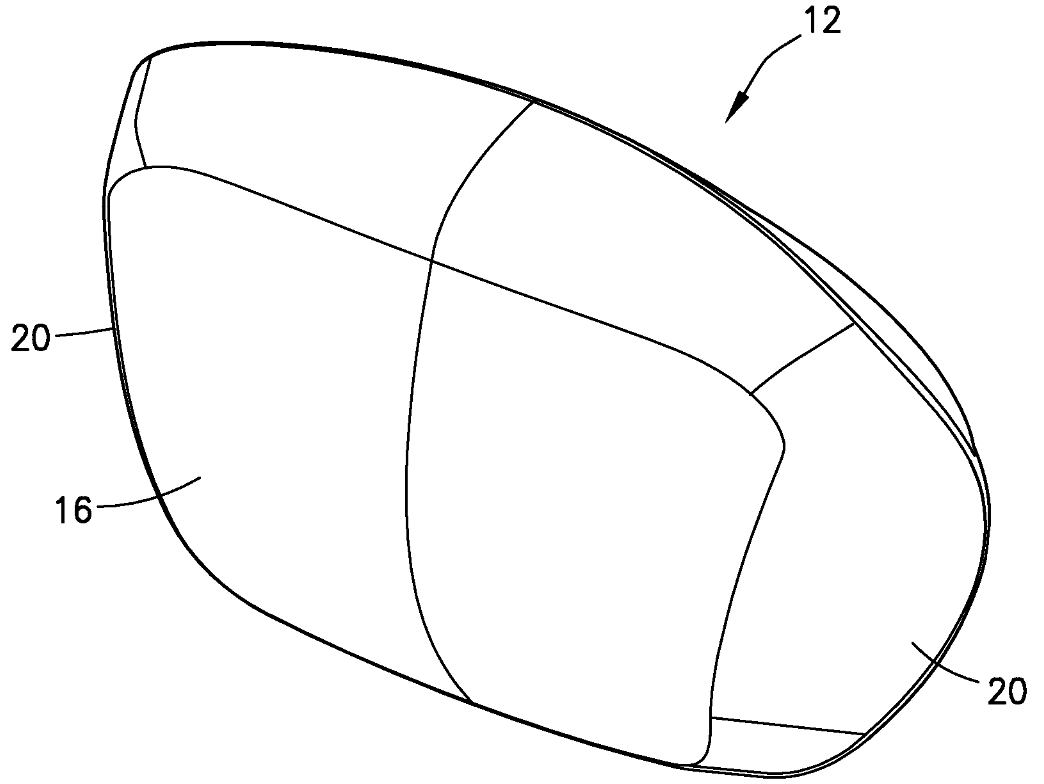
FIG. 1C is a perspective view of a cushion of the massage pillow of FIG. 1A, according to an aspect of the disclosure.
Figure 1D:
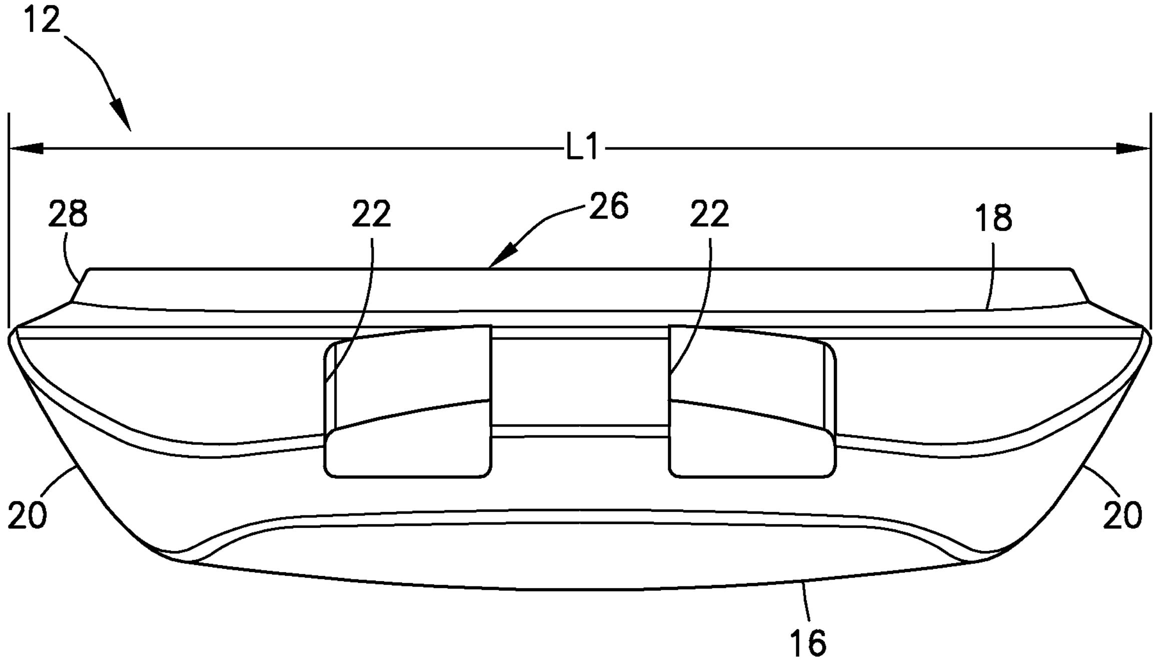
FIG. 1D is a bottom view of the cushion of FIG. 1C.
Figure 1E:
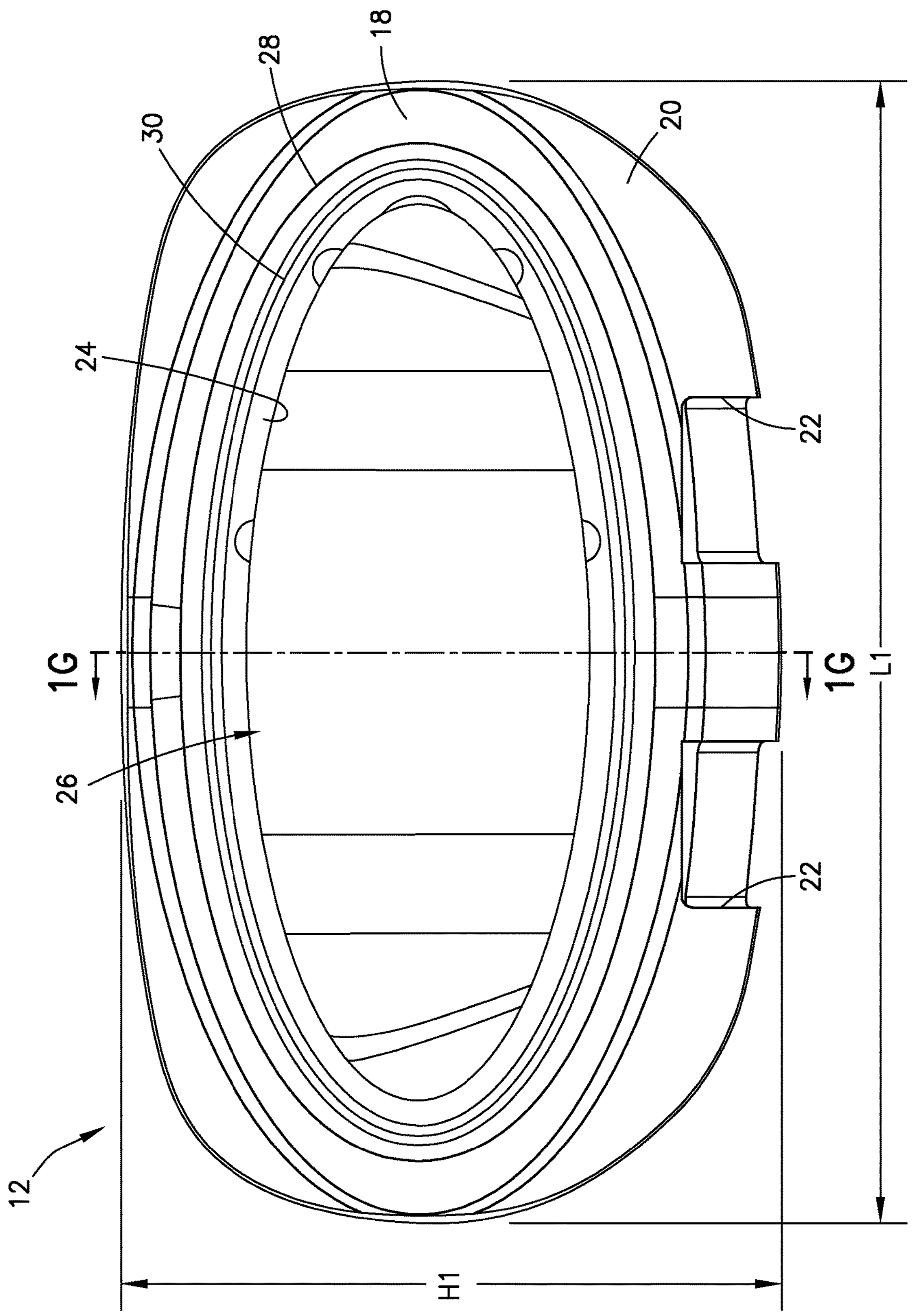
FIG. 1E is a rear side view of the cushion of FIG. 1C.
Figure 1G:
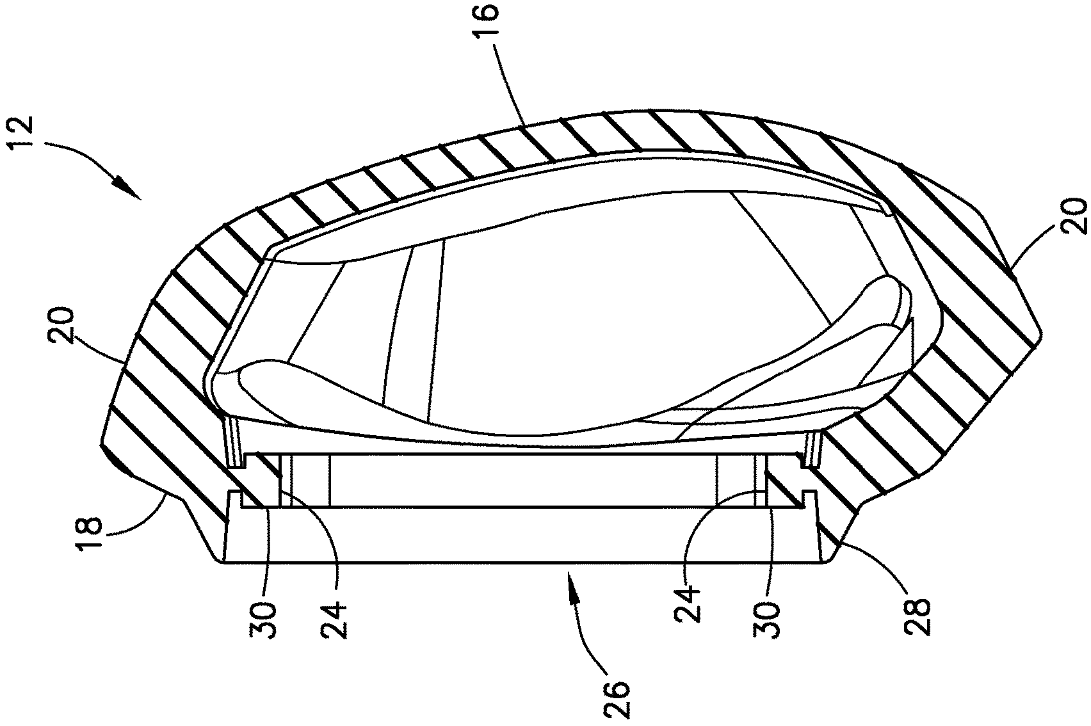
FIG. 1G is a cross-sectional view of the cushion of FIG. 1C taken along line 1G-1G (shown in FIG. 1E)
Figure 1F:
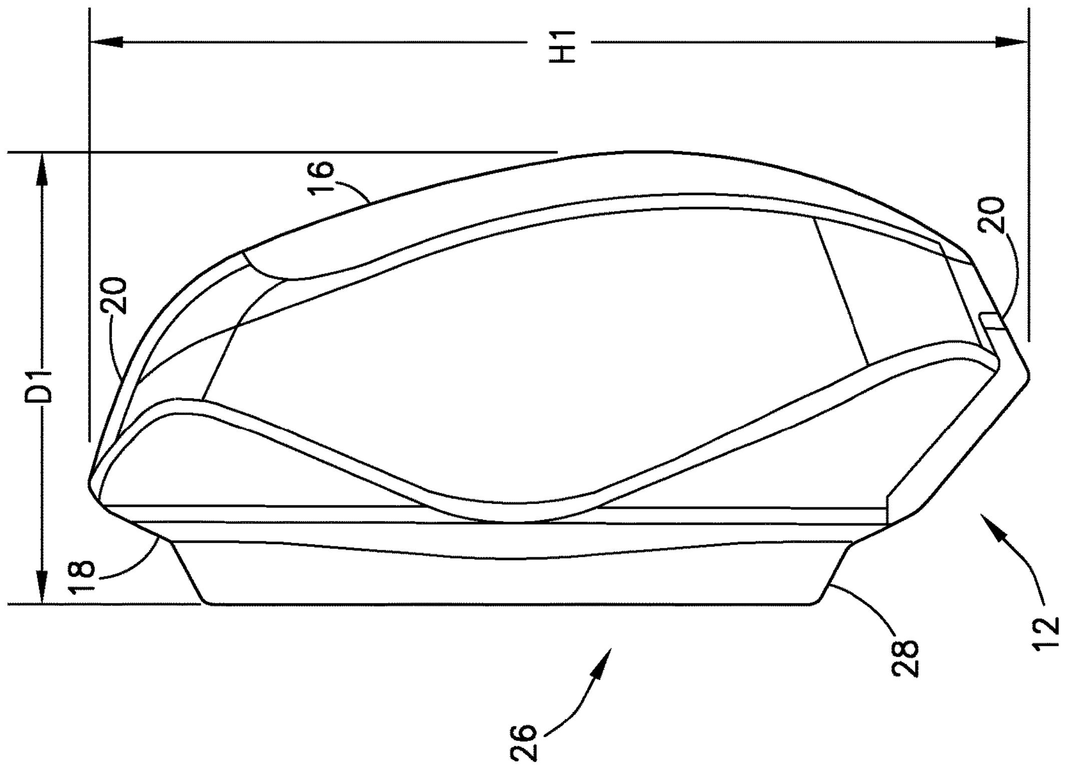
FIG. 1F is a left side view of the cushion of FIG. 1C.

In some examples, the massage pillow 10 is mounted to the vessel 102 by fasteners, such as wing nuts, accessible only from the back side of the vessel wall 116, as shown, for example, in FIGS. 1A and 1B. In that case, in order to remove the pillow 10, the user must access the back side of the wall 116 through, for example, an access port or opening in a spa cabinet or similar enclosing structure. In other examples, as shown in FIGS. 2A, 2B, 4A, and 4B, the pillow 10*b*, 10*d* can be removed by unsnapping or disengaging connectors on the front side of the vessel wall 116. In other examples, as shown in FIGS. 3A and 3B, the pillow 10*c* slides into a mounting plate or mounting bracket on the spa wall 116. In such cases, the pillow 10*b* may be removed from the vessel 102 by, for example, sliding the pillow 10 in the opposite direction to detach the pillow from the mounting plate or bracket.

Heated Massage Pillows

With specific reference to FIGS. 1A and 1B, in some examples, a massage pillow 10 configured to be positioned over the jet assembly 110 includes a pillow portion or cushion 12 and an assembly or member (referred to herein as a retainer assembly 14) connected to the cushion 12 for mounting the cushion 12 to the wall 116 of the fluid-containing vessel 102. The cushion 12 detached from the retainer assembly 14 is shown in FIGS. 1C-1G. The pillow 10 disclosed herein is configured to be positioned over a jet assembly 110 including two jets 112. In other examples, the pillow 10 can be configured to be connected to a jet assembly 110 comprising only a single jet or to jet assemblies 110 comprising more than two jets 112 arranged in any convenient arrangement.

With reference to FIGS. 1A-1G, in some examples, the pillow portion or cushion 12 of the pillow 10 includes a front side or surface 16, configured to support a user's head, a rear side or surface 18 configured to rest against the wall 116 of the fluid-containing vessel 102, and one or more side surfaces 20 extending between the front surface 16 and the rear surface 18. The cushion 12 defines an interior configured to receive pressurized fluid from the jets 112 of the jet assembly 110. The cushion 12 can be a molded structure formed from soft, flexible material, such as a synthetic foam or membrane.

The cushion 12 can be any convenient size suitable for supporting the user's head and neck. For example, the cushion 12 can have a length L1 (shown in FIGS. 1D and 1E) of about 8 inches to 12 inches and a height H1 (shown in FIGS. 1E and 1F) of about 4 inches to 8 inches. The cushion 12 may extend from the wall 116 of the vessel 102 by a distance D1 (shown in FIG. 1F) of about 2 inches to 5 inches. The cushion 12 may be waterproof and/or nonporous so that fluid does not pass through the cushion 12. Instead, fluid may flow from the cushion 12 through one or more slots 22 extending along a bottom portion of the side surface 20 of the cushion 12.

In some examples, the cushion 12 is self-supporting, meaning that the cushion 12 does not deflate or collapse when the fluid from the jets 112 is turned off. Further, the cushion 12 may be sufficiently rigid to support a user's head and neck even when the jets 112 of the jet assembly 110 are turned off. In order to provide such self-supporting characteristics, the cushion 12 may be formed from foam of sufficient thickness to maintain its shape when a force caused by a weight of the user's head is applied to the front surface 16 of the cushion 12. For example, the foam or another membrane material of the cushion 12 may be about 0.25 inch to about 1.0 inch thick.

The cushion 12 can include an annular edge 24 defining an opening 26 extending through the rear surface 18 of the cushion 12. The opening 26 is sized to fit around the jets 112 and/or jet assembly 110, so that fluid expelled from the jets 112 passes into the interior of the cushion 12 through the opening 26. Fluid expelled into the interior of the cushion 12 from the jets 112 flows into the fluid-containing vessel 102 through the drainage opening or slot 22. The cushion 12 can also include an annular or partially annular shroud 28 or seal extending proximally from the rear surface 18 of the cushion 12. The shroud 28 or seal extends around at least a portion of the annular edge 24 of the cushion 12. The shroud 28 or seal is configured to contact portions of the retaining assembly 14 and/or the jet assembly 110 for enhancing the connection between the cushion 12 and the wall 116 of the fluid-containing vessel 102. In some examples, the annular edge 24 of the cushion 12 also includes a raised lip 30 configured to enhance the connection between the cushion 12 and retainer assembly 14. For example and as described in further detail herein, the lip 30 can be seated in a groove or recess of the retainer assembly 14, thereby fixing the cushion 12 to the retainer assembly 14.

With specific reference to FIGS. 1A and 1B, in some examples, the retainer assembly 14 includes a first or proximal retainer 32 and a second or distal retainer 34. When the pillow 10 is connected to the jet assembly 110, the proximal retainer 32 is positioned nearest to the jet assembly 110. The distal retainer 34 is positioned inside the interior of the cushion 12. The retainers 32, 34 can be plates including an inner edge 36 defining a central opening 38 sized to receive or align with the jet assembly 110 and a peripheral edge 40. The retainers 32, 34 can be formed from any suitable rigid material, such as hard plastic, which can be manufactured by, for example, injection molding. One or both of the retainers 32, 34 can include a raised edge or lip extending about the peripheral edge 40 and/or the inner edge 36 of retainers 32, 34. For example, the first or proximal retainer 32 can include a distally extending lip and the second or distal retainer 34 can include a proximally facing lip. The extended lips can be aligned so that when the retainers 32, 34 are connected together, the lips enclose a partially hollow cavity that retains the annular edge 24 of the cushion 12.

As shown in FIG. 1B, the proximal retainer 32 and the distal retainer 34 are connected together, with the annular edge 24 of the cushion 12 retained or sandwiched between inwardly facing surfaces and/or the raised lips of the retainers 32, 34. As previously discussed, the annular edge 24 of the cushion 12 can include the raised lip 30, which is retained between the raised lips on the peripheral edge 40 of the retainers 32, 34.

In some examples, the retainers 32, 34 include structure(s) for fixedly connecting the retainers 32, 34 together. For example, the retainers 32, 34 can be connected together by a snap-fit connection, in which one or more members are cantilever snap-fit together to form a removable or permanent connection between the proximal retainer 32 and the distal retainer 34. In some examples, as shown in FIG. 1A, the snap-fit connection is formed from one or more tabs 42 extending from a proximally facing surface of the second or distal retainer 34. The tabs 42 are configured to be received within corresponding recesses or slots 22 on the first or proximal retainer 32. As will be appreciated by those skilled in the art, a snap-fit connection between the retainers 32, 34 is formed by pressing the retainers 32, 34 together, such that each tab 42 inserts into a corresponding recess or slot 22 and such that the annular edge 24 of the cushion 12 is retained between the peripheral edges 40 of the retainers 32, 34, thereby fixing the retainer assembly 14 to the cushion 12.

In some examples, the retainer assembly 14 further includes a connector, such as an anchor, post, or fastener, for mounting the retainer assembly 14 and cushion 12 to the wall 116 of the fluid-containing vessel 102. For example, as shown in FIG. 1A, a threaded post 46 can extend from a proximally-facing side of the retainer assembly 14. The threaded post 46 can include helical threads extending along an entire length of the post 46 or along only a portion of the length of the post 46. The threaded post 46 is configured to be inserted through a hole in the wall 116 of the fluid-containing vessel 102. Fasteners, such as wing nuts 48 and/or bushings 50, are secured to the post 46, thereby fixing the retainer assembly 14 and cushion 12 to the wall 116 of the fluid-containing vessel 102. In order to remove the retainer assembly 14 and cushion 12 from the spa, it is necessary to access the back of the vessel wall 116 to disconnect the wing nuts 48 and bushings 50 from the post 46.

Figure 2A:
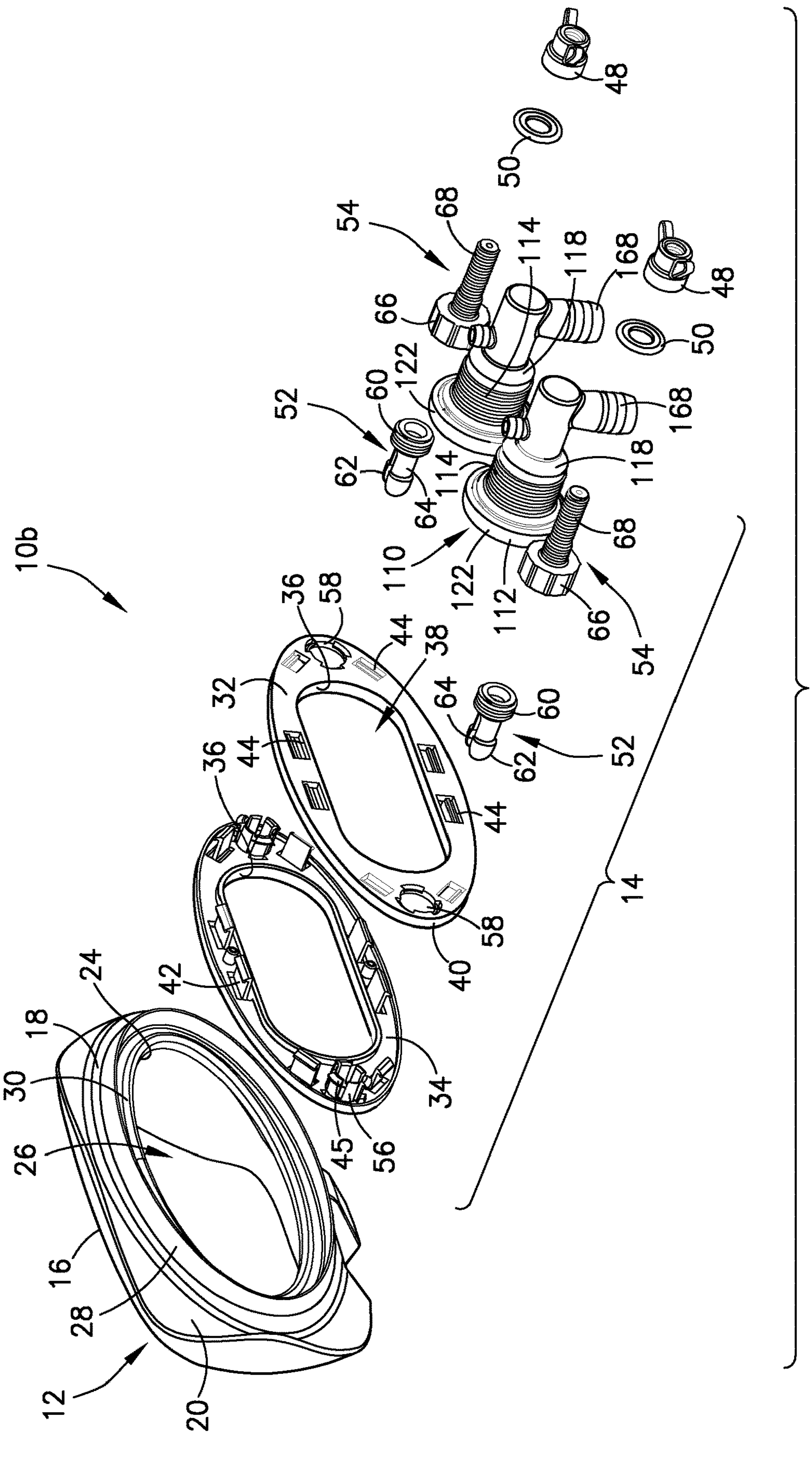
FIG. 2A is a perspective exploded view of another example of a massage pillow, according to an aspect of the present disclosure.
Figure 2B:
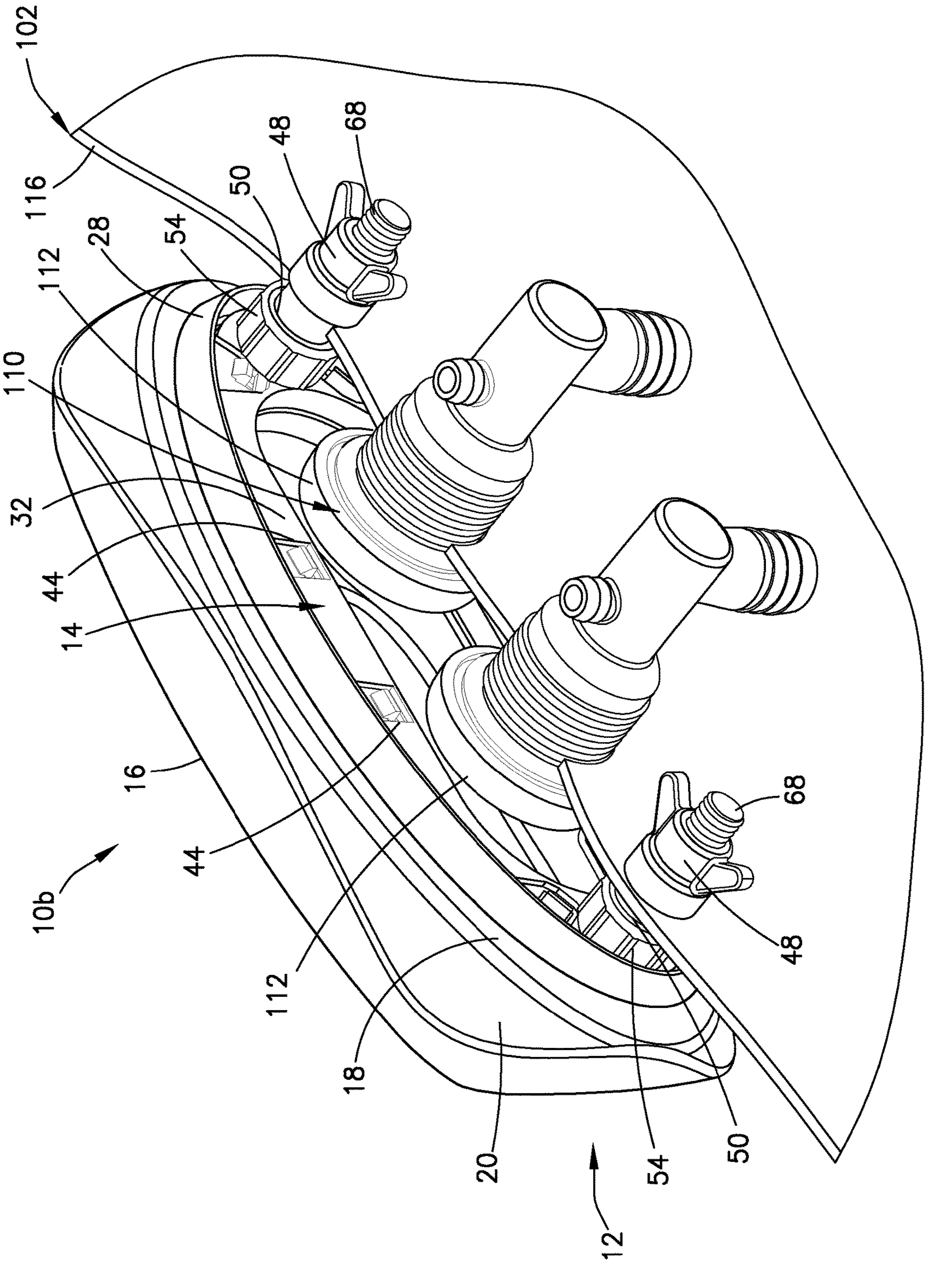
FIG. 2B is a perspective view of a rear side of the massage pillow of FIG. 2A mounted to a wall of a spa.

Another example of a massage pillow 10*b* including the cushion 12 mounted to the retainer assembly 14 is depicted in FIGS. 2A and 2B. The connection between the cushion 12 and the retainer assembly 14 is generally the same as in the previous examples. Specifically, the annular edge 24 of the cushion 12 is sandwiched between peripheral edges 40 of the first or proximal retainer 32 and the second or distal retainer 34 of the retainer assembly 14, thereby fixing the cushion 12 to the retainer assembly 14. However, the threaded post 46 from the previous example is replaced with a snap-fit joint formed between a snap-fit connector 52 and a grommet 54 mounted to the wall 116 of the fluid-containing vessel 102. The snap-fit joint between the connector 52 and the grommet 54 can be connected and disconnected from the front of the wall 116, making removing or replacing the pillow 10 easier than in previous examples. In contrast, in order to release the wing nuts 48 from the threaded post 46 (shown in FIGS. 1A and 1B) in previous examples, the user needed to access the back of the wall 116 through, for example, a spa cabinet or similar access port.

With specific reference to FIGS. 2A and 2B, each of the retainers 32, 34 includes a first through hole 56 and a second through hole 58 on the opposite side of the retainers 32, 34 from the first through hole 56. The first through hole 56 can include one or more tabs 45 extending around the hole 56 configured to be inserted through the second through hole 58 to secure the retainers 32, 34 together. Also, the through holes 56, 58 are sized to receive the snap-fit connectors 52. The connectors 52 include a first or proximal end 60, an opposing second or distal end 62, and a narrow middle portion 64 between the proximal end 60 and the distal end 62. The distal end 62 of the connector 52 can include a bulbous portion configured to be inserted through the through holes 56, 58 of the retainers 32, 34. The proximal end 60 of the connectors 52 includes a connector configured to engage a corresponding receiving portion 66 of the grommet 54. As shown in FIG. 2B, the grommets 54 are mounted to the wall 116 of the fluid-containing vessel 102. For example, the grommets 54 can include a threaded portion 68 configured to be inserted through a hole in the wall 116 of the vessel 102. The grommets 54 can be fixed to the wall 116 by wingnuts 48, similar to the wingnuts used for mounting the threaded post 46 to the wall 116 in the previous examples.

In order to removably mount the pillow 10*b* to the wall 116 of the fluid-containing vessel 102, the user may first install the connectors 52 to the grommets 54 by pressing and/or rotating the proximal end 60 of the connector 52 into the grommet 54. Once the connector 52 is in place, the distal end 62 of the connector 52 is inserted through the through holes 56, 58 of the retainers 32, 34, thereby mounting the pillow 10 to the wall 116 of the fluid-containing vessel 102. To remove the pillow 10*b* from the wall 116, the user grasps the pillow 10*b* and pulls the pillow 10*b* away from the wall 116 with sufficient force to overcome the engagement between the through holes 56, 58 and the distal end 62 of the connector 52. Beneficially, the pillow 10*b* can be removed from the wall 116 without needing to access the back side of the wall 116 of the vessel 102.

Another example of a massage pillow 10*c* including the cushion 12 and retainer assembly 14 is shown in FIGS. 3A and 3B. As in the previous examples, the annular edge 24 of the cushion 12 is sandwiched between the first or proximal retainer 32 and the second or distal retainer 34 of the retainer assembly 14, thereby fixing the cushion 12 to the retainer assembly 14. The retainers 32, 34 can be connected together by a snap-fit cantilever connection, as in previous examples. Unlike in previous examples, the massage pillow 10*c* in FIGS. 3A and 3B is configured to be slideably mounted to a mounting member, such as a mounting fixture 70, secured to the wall 116 of the fluid-containing vessel 102.

With specific reference to FIGS. 3A and 3B, the mounting fixture 70 can be an annular plate defining a central opening 72 sized to receive or fit over the jet assembly 110 and jets 112. The mounting fixture 70 includes a proximal side or surface configured to be positioned against the wall 116 of the vessel 102 and an outwardly facing distal side or surface positioned to be engaged to the second or proximal retainer 32. The mounting fixture 70 can include threaded posts 74 extending from the proximal side or surface of the mounting fixture 70. The posts 74 can be configured to be inserted into corresponding holes in the wall 116 of the vessel 102. The posts 74 are secured in the holes by wing nuts 48 and bushings 50 connected to the posts 74 as shown in FIGS. 3A and 3B.

In some examples, the distal side or surface of the mounting fixture 70 includes t-shaped recesses 76. The recesses 76 are sized to receive corresponding t-shaped tabs 78 extending from the proximal surface of the first or proximal retainer 32, as shown in FIG. 3A. In order to connect the retainer assembly 14 and cushion 12 to the mounting fixture 70, the retainer assembly 14 slides onto the mounting fixture 70 in a direction of arrow A (shown in FIG. 3A), such that the tabs 78 of the first or proximal retainer 32 are received in the t-shaped recesses 76. The pillow 10 can be easily removed from the mounting fixture 70 by sliding the pillow 10 in the opposite direction, thereby releasing the tabs 78 from the recesses 76. Beneficially, in this example, the direction of movement for attaching and detaching the pillow 10 from the mounting fixture 70 is different from the direction that water is expelled from the jets 112. Therefore, the stream of water from the jets 112 is unlikely to detach the pillow 10 from the mounting fixture 70. For example, as shown in FIGS. 3A and 3B, the pillow 10 is moved vertically (e.g., in a downward direction shown by arrow A in FIG. 3A) to attach the pillow 10 to the mounting fixture 70 and to remove the pillow 10 from the mounting fixture 70. The stream of water is expelled from the jets 112 in a horizontal direction.

Another example of a massage pillow 10*d* including the cushion 12 and retainer assembly 14 configured to be engaged to a mounting member, such as a mounting fixture 70 or plate, is shown in FIGS. 4A and 4B. As in the previous examples, the annular edge 24 (not shown in FIGS. 4A and 4B) of the cushion 12 is sandwiched between the first or proximal retainer 32 and the second or distal retainer 34 of the retainer assembly 14, thereby fixing the cushion 12 to the retainer assembly 14. Also, as in the previous examples, the mounting fixture 70 is fixed to the wall 116 of the vessel 106 by the threaded post 74 extending from the proximal side of the mounting fixture 70. The posts 74 extend through holes in the wall 116 of the fluid-containing vessel 102 and are held in place by bushings or gaskets 50 and wing nuts 48.

Unlike in previous examples, the pillow 10*d* and retainer assembly 14 in FIGS. 4A and 4B is sized to fit over a jet assembly 110 including three linearly aligned jets 112. Also unlike in the previous examples which included a single opening sized to fit around the two jets 112, the mounting fixture 70 shown in FIGS. 4A and 4B includes separate circular openings 72, each of which is sized to fit around one jet 112. Further, the massage pillow 10*d* in FIGS. 4A and 4B is not slidably connected to the mounting fixture 70. Instead, the mounting fixture 70 includes locking tabs 80 extending in a distal direction from the distal side or surface of the mounting fixture 70. The locking tabs 80 are positioned to be inserted through the central opening 38 of the retainers 32, 34 of the retainer assembly 14 and to engage the annular inner edge 36 of the retainers 32, 34, thereby removably fixing the retainer assembly 14 to the mounting fixture 70.

In order to connect the pillow 10*d* to the mounting fixture 70, the user pushes the pillow 10*d* onto the mounting fixture 70, such that the locking tabs 80 snap into engagement with the inner edges 36 of the retainers 32, 34, thereby forming a snap-fit connection between the retaining assembly 14 and the mounting fixture 70. In some examples, the pillow 10*d* can be configured to swing or rotate into place, meaning that the direction of movement for attaching or detaching the pillow 10*d* from the mounting fixture (e.g., swing or rotation in a downward arc) is different from the direction (e.g., horizontal) of the stream of water expelled from the jets 112. For example, in order to attach the pillow to the mounting fixture 70, a user may insert the two upper locking tabs 80 into the central opening 38 of the retainers 32, 34 and then swing the pillow 10*d* in a downward arc causing the lower locking tabs 80 to engage a lower portion of the inner edge 36 of the retainers 32, 34.

In order to remove the pillow 10*d* from the mounting fixture 70, the user can insert his or her fingers through the slots 22 (shown in FIGS. 1A and 3A) on the bottom side surface 20 of the cushion 12 and press the tabs 80 in an upwards direction, which causes the lower tabs 80 to release from the inner edge 36 of the retainers 32, 34. Once the lower tabs 80 are released, the user can swing the pillow 10*d* in an upwards arc to release the upper locking tabs 80 from the inner edge 36. Once the locking tabs 80 are released, the pillow 10*d* can be removed by pulling the pillow 10*d* away from the mounting fixture 70 and vessel wall 116.

Spa or Hot Tub Including Fluid Circulation Systems

Figure 5:
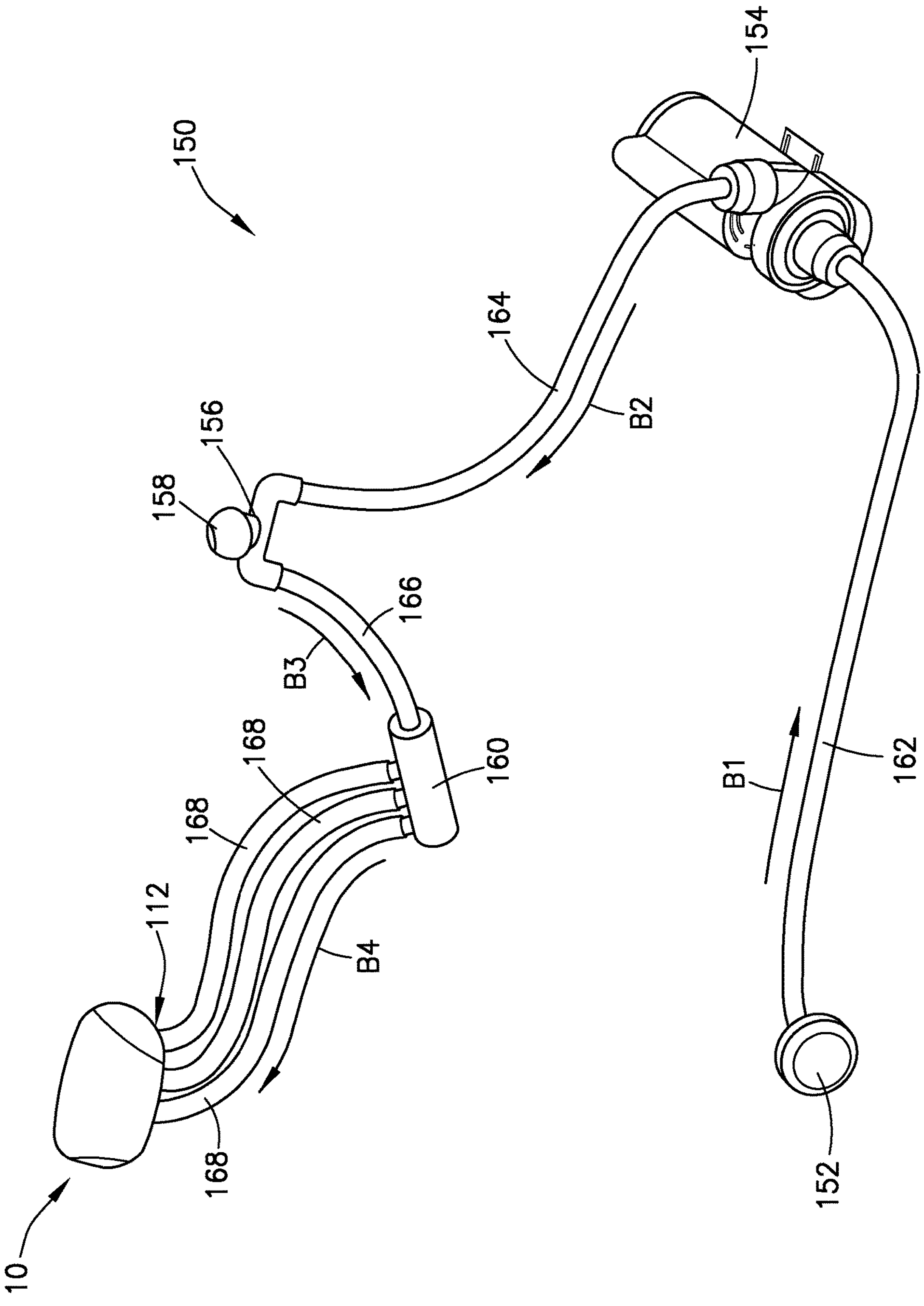
FIG. 5 is a perspective view of a fluid distribution system for a spa including a massage pillow, according to an aspect of the disclosure.

With reference to FIGS. 5 and 6, the massage pillows 10, 10*b*, 10*c*, 10*d* disclosed herein are adapted to be used with fluid-containing vessels 102 including a fluid circulation system 150 for heating and circulation of fluids contained in the vessel 102. In some examples, the fluid circulation system 150 for the vessel 102 includes a suction or fluid intake 152 configured to be positioned in wall 116 or shell of the vessel 102. The fluid circulation system 150 also includes a pump 154 configured to draw fluid into the fluid intake 152 and to expel the fluid, as a pressurized fluid stream, from the jets 112 of the jet assembly 110. The system 150 shown in FIGS. 5 and 6 includes a jet assembly 110 with three jets 112. However, as discussed previously, the pillows 10, 10*b*, 10*c*, 10*d* disclosed herein can be adapted for use with fewer than three or more than three jets 112. The pump 154 can also include a heater for warming the fluid passing through the fluid circulation system 150 so that a warmed pressurized fluid stream is provided from the jets 112. An ozone injector (not shown) can also be provided in fluid communication with the fluid circulation system 150. The ozone injector supplies ozone to the liquid for disinfection and cleaning purposes.

The fluid circulation system 150 also includes a control valve 156 for controlling fluid flow to the jets 112. For example, the control valve 156 can be used to turn the fluid flow on and off. The control valve 156 can include a knob 158 for manually opening and closing the valve 156. For example, the valve 156 may be opened by turning the knob 158 in a clockwise direction and closed by turning the knob 158 in a counter-clockwise direction. In other examples, the valve 156 can be an automatically actuated valve or a valve actuated by an electronic control system. In some examples, the control valve 156 is a two-stage valve that can be in either an open position or a closed position. In other examples, the control valve 156 can be adjusted to a variety of positions or any position between closed and open, so that the intensity of the pressurized fluid and/or the fluid flow volume can be adjusted.

The fluid circulation system 150 also includes a diverter or manifold 160 for dividing fluid provided from the pump 154 between, for example, the three jets 112 of the jet assembly 110. In some examples, the manifold 160 is configured to deliver an equal volume of fluid to each jet 112. In other examples, the manifold 160 can be configured to deliver a greater volume of fluid and/or higher fluid pressure to one or two of the three jets 112. In some examples, the diverter 160 can be adjustable, so that a user can vary a portion of pressurized fluid provided to each jet 112. The fluid circulation system 150 also includes conduits between components of the system 150 for permitting fluid flow through the system 150. For example, the system 150 can include a return conduit 162 extending between the intake 152 and the pump 154. The system 150 can also include a pump discharge conduit 164 extending between the pump 154 and the control valve 156 and a fluid discharge conduit 166 extending between the valve 156 and the manifold 160. Finally, the system 150 can include manifold discharge conduits 168 extending between the manifold 160 and each individual jet 112. As shown in FIG. 6, the system 150 includes three manifold discharge conduits 168 for the three jets 112 of the jet assembly 110. In other examples, the system 150 will include fewer or more than three manifold discharge conduits 168, depending on the number of jets 112. The conduits 162, 164, 166, 168 can be flexible tubes formed from plastic materials, as are known in the art. As discussed previously and as shown in FIGS. 5 and 6, the jets 112 of the jet assembly 110 are covered by the massage pillow 10. As shown in FIG. 6, the massage pillow 10 is mounted to the wall 116 of the fluid-containing vessel 102 and supports a user's head, as the user reclines on the molded seating area 170 or bench formed by the wall 116 of the vessel 102. The fluid intake 152 can be positioned near the bottom surface of the wall 116 or shell of the vessel 102. The control valve 154 can be positioned above the water level or line of the fluid-containing vessel 102, such as on a top lip or shelf portion of the wall 116, as shown in FIG. 6.

In use, fluid (e.g., water treated by an ozone injector and/or sanitizing chemicals) flows through the conduits 162, 164, 166, 168 or tubing of the fluid circulation system 150 as shown by the arrows B1, B2, B3, B4, B5 in FIG. 5 and as described herein. Specifically, the fluid is drawn into the suction or intake 152 and moves through the return conduit 162 to the heater and pump 154 in the direction of arrow B1. The fluid is pressurized by the pump 154 and passes from the pump 154 to the control valve 156 through the pump discharge conduit 164, in the direction of arrow B2. If the control valve 154 is open (as shown in FIG. 5) or partially open, the fluid passes from the open valve 156 to the manifold 160 through the discharge conduit 164, in the direction of arrow B3. The fluid passes through the manifold 160, where it is divided into separate fluid paths. Once separated, the fluid flows from the manifold 160 to the jets 112 through the conduits 168, in the direction of arrow B4. The fluid is then expelled (as a warmed and pressurized fluid stream) from the jets 112 into the interior defined by the cushion 12 of the massage pillow 10. The fluid then flows through the drainage opening or slots 22 in the cushion 12, in the direction of arrow B5, to return to the vessel 102.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. Furthermore, it is to be understood that the present invention contemplates that, to the extent possible, one or more features of any embodiment can be combined with one or more features of any other embodiment.

The invention claimed is:

1. A massage pillow configured to be positioned over at least one fluid jet, the massage pillow comprising:
- a cushion comprising:
  - a front surface,
  - a rear surface,
  - side surfaces extending between the front surface and the rear surface,
  - at least one drainage opening extending through the side surfaces of the cushion for draining fluid from an interior of the cushion, wherein the rear surface comprises an annular edge defining a jet opening providing access to the interior of the cushion sized to at least partially cover the at least one jet, and
  - an annular shroud extending from the rear surface of the cushion and around the annular edge; and
- a retainer assembly comprising an opening configured to align with the at least one jet and a peripheral edge that engages the annular edge of the cushion thereby providing an annular seal between the rear surface of the cushion and the retainer assembly,
- wherein the annular shroud is configured to contact the retainer assembly providing an additional annular seal between the cushion and the retainer assembly, and
- wherein the retainer assembly is configured to be removably fixed to a wall surrounding the at least one jet with the at least one jet aligned with the opening of the retainer assembly and the jet opening of the cushion, such that fluid expelled from the at least one jet passes into the interior of the cushion, so that the massage pillow provides at least massage and/or warmth due to the expelled fluid.

2. The massage pillow of claim 1, wherein the massage pillow is configured to be positioned over at least two linearly-aligned fluid jets.

3. The massage pillow of claim 1, wherein the cushion comprises molded plastic.

4. The massage pillow of claim 1, wherein the cushion is sufficiently rigid to maintain its shape when fluid is not being expelled from the at least one jet.

5. The massage pillow of claim 1, wherein the cushion is configured to be self-supporting to support a user's head when fluid is not being expelled from the at least one jet.

6. The massage pillow of claim 1, wherein the front surface of the cushion is configured to support a user's head and/or neck and the rear surface of the cushion is configured to rest against the wall.

7. The massage pillow of claim 1, wherein the retainer assembly comprises at least one threaded post extending from a proximal facing side of the retainer assembly, the at least one threaded post being configured to anchor the massage pillow to the wall.

8. The massage pillow of claim 1, wherein the retainer assembly further comprises at least one snap-fit joint configured to engage a corresponding grommet mounted to the wall for removably fixing the massage pillow to the wall.

9. The massage pillow of claim 1, wherein the retainer assembly comprises at least one locking tab configured to engage a corresponding slot of a mounting member mounted to the wall for removably connecting the retainer assembly to the mounting member.

10. The massage pillow of claim 9, wherein the at least one locking tab is configured to be slideably received within the at least one slot, such that the massage pillow can be slidably connected and removed from the mounting member.

11. The massage pillow of claim 1, wherein the retainer assembly is configured to be mounted to a mounting member by a snap-fit connection, in which at least one snap-fit member of the mounting member engages an inner edge extending about the opening of the retainer assembly.

12. The massage pillow of claim 1, wherein the retainer assembly comprises:
- at least one retainer plate connected to the cushion, which comprises the jet opening configured to align with the at least one jet and the peripheral edge engaged to the annular edge of the cushion; and
- at least one snap-fit connector comprising (i) a first end comprising a bulbous portion inserted through a through-hole of the at least one retainer plate for removably securing the at least one snap-fit connector to the at least one retainer plate and (ii) a second end opposite the first end, the second end comprising a threaded portion configured to be received within a threaded grommet mounted to the wall for mounting the at least one snap-fit connector to the wall.

13. A massage pillow configured to be positioned over at least one fluid jet, the massage pillow comprising:
- a cushion comprising a front surface, a rear surface, side surfaces extending between the front surface and the rear surface, and at least one drainage opening extending through the side surfaces of the cushion for draining fluid from an interior of the cushion, wherein the rear surface comprises an annular edge defining a jet opening providing access to the interior of the cushion sized to at least partially cover the at least one jet; and a retainer assembly comprising an opening configured to align with the at least one jet and a peripheral edge that engages the annular edge of the cushion thereby providing an annular seal between the rear surface of the cushion and the retainer assembly, wherein the retainer assembly further comprises at least one first retainer fixed to at least one second retainer, with the annular edge of the cushion retained between the at least one first retainer and the at least one second retainer of the retainer assembly, thereby fixing the cushion to the retainer assembly, and wherein the retainer assembly is configured to be removably fixed to a wall surrounding the at least one jet with the at least one jet aligned with the opening of the retainer assembly and the jet opening of the cushion, such that fluid expelled from the at least one jet passes into the interior of the cushion, so that the massage pillow provides at least massage and/or warmth due to the expelled fluid.

14. The massage pillow of claim 13, wherein the cushion further comprises an annular shroud extending from the rear surface of the cushion and around the annular edge, wherein the annular shroud is configured to contact the retainer assembly providing an additional annular seal between the cushion and the retainer assembly.

15. The massage pillow of claim 13, wherein the at least one first retainer and the at least one second retainer each comprise openings configured to be aligned with the at least one jet when the massage pillow is positioned over the at least one jet.

16. The massage pillow of claim 13, wherein the at least one first retainer is connected to the at least one second retainer by a cantilever snap-fit connection.

17. A fluid-containing vessel comprising:

a wall defining a fluid-containing portion;

at least one jet extending through the wall for expelling pressurized fluid into the fluid-containing portion of the vessel;

a fluid circulation system comprising: a pump and a plurality of conduits for conducting fluid between the fluid-containing portion of the vessel, the pump, and the at least one jet; and a massage pillow configured to be positioned over at least one fluid jet, the massage pillow comprising:

a cushion comprising a front surface, a rear surface, side surfaces extending between the front surface and the rear surface, and at least one drainage opening extending through the side surfaces of the cushion for draining fluid from an interior of the cushion, wherein the rear surface comprises an annular edge defining a jet opening providing access to the interior of the cushion sized to at least partially cover the at least one jet; and a retainer assembly comprising an opening configured to align with the at least one jet and a peripheral edge that engages the annular edge of the cushion thereby providing an annular seal between the rear surface of the cushion and the retainer assembly, wherein the retainer assembly further comprises:

at least one retainer plate connected to the cushion, which comprises the jet opening configured to align with the at least one jet and the peripheral edge engaged to the annular edge of the cushion, and at least one snap-fit connector comprising (i) a first end comprising a bulbous portion inserted through a through-hole of the at least one retainer plate for removably securing the at least one snap-fit connector to the at least one retainer plate and (ii) a second end opposite the first end, the second end comprising a threaded portion configured to be received within a threaded grommet mounted to the wall of the vessel for mounting the at least one snap-fit connector to the wall of the vessel, and wherein the retainer assembly is configured to be removably fixed to the wall of the vessel with the at least one jet aligned with the opening of the retainer assembly and the opening of the cushion, such that fluid expelled from the at least one jet passes into the interior of the cushion, so that the massage pillow provides at least massage and/or warmth due to the expelled fluid.

18. The fluid-containing vessel of claim 17, further comprising a control valve connected to the plurality of conduits between the pump and the at least one jet, wherein the control valve is configured to adjust at least one of flow volume or pressure of fluid expelled from the at least one jet.

19. The fluid-containing vessel of claim 17, wherein the fluid circulation system comprises at least two linearly aligned jets, and wherein the opening of the retainer assembly is sized to receive the at least two linearly aligned jets.

20. A method for mounting a massage pillow to a fluid-containing vessel, the method comprising:

providing a cushion of the massage pillow, the cushion comprising:

a front surface, a rear surface, side surfaces extending between the front surface and the rear surface, at least one drainage opening extending through the side surfaces of the cushion for draining fluid from an interior of the cushion, wherein the rear surface comprises an annular edge defining a jet opening providing access to the interior of the cushion sized to at least partially cover at least one jet extending through a wall of the fluid-containing vessel, and an annular shroud extending from the rear surface of the cushion and around the annular edge;

connecting a retainer assembly comprising an opening configured to align with the at least one jet to the cushion of the massage pillow such that a peripheral edge of the retainer assembly engages the annular edge on the rear surface of the cushion, thereby providing an annular seal between the rear surface of the cushion and the retainer assembly, wherein the annular shroud is configured to contact the retainer assembly providing an additional annular seal between the cushion and the retainer assembly; and mounting the retainer assembly to the wall of the fluid-containing vessel, such that the at least one jet of the fluid-containing vessel is received by the opening of the retainer assembly and is positioned to expel fluid through the opening of the retainer assembly, into the interior of the cushion of the massage pillow.

* * * * *